(12) United States Patent
Tamura

(10) Patent No.: US 10,544,262 B2
(45) Date of Patent: Jan. 28, 2020

(54) POLYAMIDE

(71) Applicant: KURARAY CO., LTD., Kurashiki-shi (JP)

(72) Inventor: Kozo Tamura, Koto-ku (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/301,257

(22) PCT Filed: Mar. 6, 2015

(86) PCT No.: PCT/JP2015/001246
§ 371 (c)(1),
(2) Date: Sep. 30, 2016

(87) PCT Pub. No.: WO2015/151410
PCT Pub. Date: Oct. 8, 2015

(65) Prior Publication Data
US 2017/0015787 A1    Jan. 19, 2017

(30) Foreign Application Priority Data

Apr. 2, 2014 (JP) .................................. 2014-076333

(51) Int. Cl.
 *C08G 69/26* (2006.01)
 *C08G 69/44* (2006.01)
(52) U.S. Cl.
 CPC ............. *C08G 69/26* (2013.01); *C08G 69/44* (2013.01)
(58) Field of Classification Search
 CPC ............................ C08L 77/06; C08G 73/1075
 See application file for complete search history.

(56) References Cited

U.S. PATENT DOCUMENTS

| 5,670,608 A | 9/1997 | Oka et al. |
| 6,156,869 A | 12/2000 | Tamura et al. |
| 2009/0149590 A1* | 6/2009 | Eroshov ................ C08G 69/14 524/417 |
| 2011/0028060 A1* | 2/2011 | Wakeman ................ C08J 5/04 442/131 |
| 2013/0085257 A1 | 4/2013 | Nitto et al. |
| 2013/0231424 A1* | 9/2013 | Anada ........................ C08J 5/18 524/126 |
| 2013/0253115 A1* | 9/2013 | Jeol ........................ C08L 77/00 524/387 |
| 2014/0205783 A1* | 7/2014 | Jeol ........................ C08G 69/00 428/36.9 |

FOREIGN PATENT DOCUMENTS

| EP | 1 226 202 | 7/2002 |
| EP | 2 749 586 | 7/2014 |
| JP | 59-53536 A | 3/1984 |
| JP | 7-228689 A | 8/1995 |
| JP | 7-292101 A | 11/1995 |
| JP | 10139879 | * 5/1998 |
| JP | 2000-72872 A | 3/2000 |
| JP | 2000-103847 A | 4/2000 |
| JP | 2002-3601 A | 1/2002 |
| WO | WO 01/25311 | 4/2001 |
| WO | 2011/162350 A1 | 12/2011 |

OTHER PUBLICATIONS

International Search Report dated Jun. 9, 2015 in PCT/JP15/001246 Filed Mar. 6, 2015.
Supplementary European Search Report dated Oct. 20, 2017, in European Patent Application No. 15773061.5.

* cited by examiner

*Primary Examiner* — Gregory Listvoyb
(74) *Attorney, Agent, or Firm* — Oblon, McClelland, Maier & Neustadt, L.L.P.

(57) ABSTRACT

The present invention provides a polyamide having excellent heat resistance, water resistance, and impact resistance. The present invention relates to a polyamide including: structural units derived from an aromatic dicarboxylic acid; and structural units derived from an aliphatic diamine. This polyamide contains 0.40 to 0.70 mol % in total of hydroxyl groups and ester groups with respect to 100 mol % of structural units derived from dicarboxylic acids.

20 Claims, No Drawings

POLYAMIDE

TECHNICAL FIELD

The present invention relates to a polyamide having excellent heat resistance, water resistance, and impact resistance.

BACKGROUND ART

Due to their excellent properties and good melt-moldability, crystalline polyamides such as nylon 6 and nylon 66 have been widely used in fibers for clothing and industrial materials and as general-purpose engineering plastics.

However, it has been noted that such crystalline polyamides have disadvantages such as insufficient heat resistance and poor dimensional stability due to absorption of water. Particularly, in the field of electrical and electronic devices that require reflow soldering heat resistance with the recent development of surface mount technology (SMT) and in automobile components such as engine room components that increasingly require higher heat resistance, conventional polyamides have become practically useless, and there is a growing demand for polyamides having better heat resistance, dimensional stability, mechanical properties, and physicochemical properties.

To meet these demands, there have been proposed various polyamides including an aromatic dicarboxylic acid unit (so-called "semi-aromatic polyamides"), such as modified PA6-T and PA9-T, having better heat resistance and chemical resistance than conventional aliphatic polyamides such as polyamide 6 and polyamide 66 (see Patent Literatures 1 and 2).

CITATION LIST

Patent Literature

Patent Literature 1: JP 59(1984)-53536 A
Patent Literature 2: JP 07(1995)-228689 A

SUMMARY OF INVENTION

Technical Problem

Such semi-aromatic polyamides are superior not only in heat resistance but also in resistance to polar solvents such as water and alcohol, but they have the disadvantage of being inferior in impact resistance to conventional aliphatic polyamides.

Solution to Problem

As a result of intensive studies, the present inventor has found that a polyamide composed mainly of aromatic dicarboxylic acid units and aliphatic diamine units and containing a specific amount of hydroxyl groups and ester groups with respect to dicarboxylic acid units has not only excellent heat resistance and water resistance but also excellent impact resistance. After further studies based on these findings, the present inventor has completed the present invention.

The present invention relates to:
[1] a polyamide including: structural units derived from an aromatic dicarboxylic acid; and structural units derived from an aliphatic diamine, the polyamide containing 0.40 to 0.70 mol % in total of hydroxyl groups and ester groups with respect to 100 mol % of structural units derived from dicarboxylic acids;
[2] the polyamide according to the above [1], containing 25 to 52 mol % of the structural units derived from the aromatic dicarboxylic acid and 30 to 53 mol % of the structural units derived from the aliphatic diamine, where a total content of the structural units derived from the aromatic dicarboxylic acid and the structural units derived from the aliphatic diamine is 100 mol % or less;
[3] the polyamide according to the above [1] or [2], wherein the aromatic dicarboxylic acid is terephthalic acid;
[4] the polyamide according to any one of the above [1] to [3], wherein the aliphatic diamine is an aliphatic diamine having 4 to 12 carbon atoms;
[5] the polyamide according to any one of the above [1] to [4], wherein the aliphatic diamine having 4 to 12 carbon atoms is at least one selected from the group consisting of 1,6-hexanediamine, 2-methyl-1,5-pentanediamine, 1,9-nonanethamine, 2-methyl-1,8-octanediamine, and 1,10-decanediamine;
[6] the polyamide according to any one of the above [1] to [5], further containing 0.5 to 4 mol % of structural units derived from a terminal blocking agent; and
[7] a method for producing the polyamide according to any one of the above [1] to [6], the method including:
a step (1) of feeding an aqueous nylon salt solution having a concentration of 50 to 90 mass % and a temperature of 100 to 180° C. into a reactor; and
a step (2) of performing polymerization under the following conditions: the aqueous solution has a temperature of 230 to 260° C. in the reactor; a pressure in the reactor is 0.70 to 0.90 times a saturated vapor pressure of water at the temperature of 230 to 260° C.; and an average residence time of the aqueous solution in the reactor is 1 hour or less.

Advantageous Effects of Invention

According to the present invention, it is possible to provide a polyamide having not only excellent heat resistance and water resistance but also excellent impact resistance, and to provide a method for producing this polyamide.

DESCRIPTION OF EMBODIMENTS

Hereinafter, the present invention is described in detail. The monomer units of the polyamide used in the present invention contain structural units derived from an aromatic dicarboxylic acid (hereinafter referred to as "aromatic dicarboxylic acid units"). It should be noted that the aromatic dicarboxylic acid is a compound containing two carboxyl groups covalently bonded directly to an aromatic ring such as a benzene ring, a naphthalene ring, or the like. Furthermore, in order to obtain a polyamide having not only excellent water resistance and impact resistance but also excellent heat resistance with a high melting point and a high glass transition temperature, the content of the aromatic dicarboxylic acid units is preferably 25 to 52 mol %, more preferably 30 to 51 mol %, and even more preferably 35 to 50 mol %. The method for evaluating the content of the aromatic dicarboxylic acid units is as described in Examples to be given below.

Examples of the above-mentioned aromatic dicarboxylic acid units include units derived from terephthalic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, 4,4'-oxydibenzoic acid, diphenylmethane-4,4'-dicarboxylic acid, diphenylsulfone-4,4'-dicarboxylic acid, and 4,4'-biphenyldicarboxylic acid. In particular, terephthalic acid units are preferred because they increase the heat resistance and water resistance.

The polyamide of the present invention may contain dicarboxylic acid units other than aromatic dicarboxylic acid units as long as the effects of the present invention are not impaired. Examples of dicarboxylic acid units other than aromatic dicarboxylic acid units include units derived from: aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, suberic acid, azelaic acid, sebacic acid, undecanedioic acid, and dodecanedioic acid; and alicyclic dicarboxylic acids such as 1,3-cyclopentanedicarboxylic acid, 1,3-cyclohexanedicarboxylic acid, and 1,4-cyclohexanedicarboxylic acid. The polyamide may contain any one of these units or may contain two or more different types of these units. The polyamide of the present invention may further contain units derived from a polyvalent carboxylic acid such as trimellitic acid, trimesic acid, or pyromellitic acid as long as the polyamide can be melt-molded.

The monomer units of the polyamide used in the present invention contain structural units derived from an aliphatic diamine (hereinafter referred to as "aliphatic diamine units"). Furthermore, in order to obtain a polyamide having excellent impact resistance and water resistance, the content of the aliphatic diamine units is preferably 30 to 53 mol %, more preferably 35 to 52 mol %, and even more preferably 38 to 51 mol %. Aliphatic diamine units having 4 to 12 carbon atoms are preferred as the aliphatic diamine units. The method for evaluating the content of the aliphatic diamine units is as described in Examples to be given below.

Examples of the aliphatic diamine units having 4 to 12 carbon atoms include units derived from: linear aliphatic diamines such as 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, and 1,12-dodecanediamine; and branched aliphatic diamines such as 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine. The polyamide may contain any one of these units or may contain two or more different types of these units.

Due to its good heat resistance and water resistance, the diamine used in the above-mentioned aliphatic diamine units is preferably at least one selected from 1,6-hexanediamine, 2-methyl-1,5-pentanediamine, 1,9-nonanediamine, 2-methyl-1,8-octanediamine, and 1,10-decanediamine, and more preferably 1,9-nonanediamine and/or 2-methyl-1,8-octanediamine.

When 1,9-nonanediamine and 2-methyl-1,8-octanediamine are used in combination as the diamine, the molar ratio between 1,9-nonanediamine and 2-methyl-1,8-octanediamine is preferably 45:55 to 90:10.

The above-mentioned diamine units may contain diamine units other than the aliphatic diamine units having 4 to 12 carbon atoms as long as the effects of the present invention are not impaired. Examples of the other diamine units include units derived from: aliphatic diamines such as ethylenediamine, 1,2-propanediamine, and 1,3-propanediamine; alicyclic diamines such as cyclohexanediamine, methylcyclohexanediamine, isophoronediamine, norbornanedimethylamine, and tricyclodecanedimethylamine; and aromatic diamines such as p-phenylenediamine, m-phenylenediamine, p-xylylenediamine, m-xylylenediamine, 4,4'-diaminodiphenylmethane, 4,4'-diaminodiphenyl sulfone, and 4,4'-diaminodiphenyl ether. The polyamide may contain any one of these units or may contain two or more different types of these units.

The polyamide of the present invention may further contain lactam units and aminocarboxylic acid units as long as the effects of the present invention are not impaired. Specific examples of the lactam units and aminocarboxylic acid units include units derived from: lactams such as ε-caprolactam and ω-lauryllactam; and aminocarboxylic acids such as 11-aminoundecanoic acid and 12-aminododecanoic acid.

The polyamide of the present invention preferably contains 4 mol % or less (except for 0 mol %), more preferably 0.5 to 4 mol %, and even more preferably 0.7 to 2.5 mol % of units derived from a terminal blocking agent as monomer units. When the content of the units derived from the terminal blocking agent is in the above range, the resulting polyamide has better physical properties such as melt-moldability. The method for evaluating the content of the units derived from the terminal blocking agent is as described in Examples to be given below.

As the terminal blocking agent, a monofunctional compound that is reactive with terminal amino groups or terminal carboxyl groups can be used. Examples of such a compound include acid anhydrides, monoisocyanates, mono-acid halides, monoesters, and monoalcohols. In terms of reactivity and stability of blocked terminals, a monocarboxylic acid is preferably used as a terminal blocking agent for terminal amino groups and a monoamine is preferably used as a terminal blocking agent for terminal carboxyl groups. A monocarboxylic acid is more preferred as a terminal blocking agent because of its ease of handling, etc.

The monocarboxylic acid used as the terminal blocking agent is not particularly limited as long as it is reactive with an amino group. Examples of such a monocarboxylic acid include: aliphatic monocarboxylic acids such as acetic acid, propionic acid, butanoic acid, valeric acid, caproic acid, caprylic acid, lauric acid, tridecanoic acid, myristic acid, palmitic acid, stearic acid, pivalic acid, and isobutyric acid; alicyclic monocarboxylic acids such as cyclohexanecarboxylic acid; aromatic monocarboxylic acids such as benzoic acid, toluic acid, α-naphthalenecarboxylic acid, 6-naphthalenecarboxylic acid, methylnaphthalenecarboxylic acid, and phenylacetic acid; and mixtures of any of these. In particular, in terms of reactivity, stability of blocked terminals, cost, etc. acetic acid, propionic acid, butanoic acid, valeric acid, caproic acid, caprylic acid, lauric acid, tridecanoic acid, myristic acid, palmitic acid, stearic acid, and benzoic acid are preferred.

The monoamine used as the terminal blocking agent is not particularly limited as long as it is reactive with a carboxyl group. Examples of such a monoamine include: aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; and mixtures of any of these. In particular, in terms of reactivity, high boiling point, stability of blocked terminals, cost, etc., butylamine, hexylamine, octylamine, decylamine, stearylamine, cyclohexylamine, and aniline are preferred.

In the polyamide of the present invention, the total content of hydroxyl groups and ester groups with respect to 100 mol % of structural units derived from dicarboxylic acids is 0.40 to 0.70 mol %, and preferably 0.45 to 0.60 mol %. When the total content of hydroxyl groups and ester groups is in the above range, the resulting polyamide has excellent impact resistance. The method for evaluating the contents of hydroxyl groups and ester groups is as described in Examples to be given below.

In the polyamide of the present invention, the content (mol %) of hydroxyl groups is preferably 0.05 to 0.40 mol %, more preferably 0.08 to 0.35 mol %, and even more preferably 0.10 to 0.30 mol % with respect to 100 mol % of the structural units derived from dicarboxylic acids.

In the polyamide of the present invention, the content (mol %) of ester groups with respect to 100 mol % of the structural units derived from dicarboxylic acids is preferably 0.5 to 12 times, more preferably 1.0 to 5.0 times, and even more preferably 1.5 to 3.0 times the content (mol %) of hydroxyl groups.

Examples of the method for introducing hydroxyl groups into the polyamide include: (1) a method of adding a diol or an amino alcohol at an arbitrary stage of the polymerization of the polyamide; and (2) a method in which the early stage of the polymerization of the polyamide is performed in the presence of water so as to allow amino groups mainly derived from the diamine to be hydrolyzed into hydroxyl groups. The method (2) is preferred. Examples of the diol include 1,4-butanediol, 1,5-pentanediol, 1,6-hexanediol, 1,7-heptanediol, 1,8-octanediol, 1,9-nonanediol, and 1,10-decanediol. Examples of the amino alcohol include 4-amino-1-butanol, 5-amino-1-pentanol, 6-amino-1-hexanol, 7-amino-1-heptanol, 8-amino-1-octanol, 9-amino-1-nonanol, and 10-amino-1-decanol. Ester groups can be produced by reacting the hydroxyl groups thus produced with carboxyl groups mainly derived from the dicarboxylic acids in the polymerization system. The contents of hydroxyl groups and ester groups in the polyamide can be adjusted within the above-mentioned ranges by appropriately controlling the amount of the diol or amino alcohol to be added and the polymerization factors such as the water content, temperature, and time in the polymerization system during the polymerization of the polyamide.

In the amidation reaction by dehydration of carboxylic acids and amines, carboxyl groups of an aromatic carboxylic acid react with amino groups of an amine more slowly than carboxyl groups of an aliphatic carboxylic acid, and thus the equilibrium of the reaction between amidation and hydrolysis is shifted to the reaction product side. Thus, the concentration of amino groups in the polyamide polymerization system is higher. As a result, amino groups are likely to be hydrolyzed into hydroxyl groups by water as a solvent added to the polymerization system or by water as condensation water produced through the amidation of carboxyl groups and amino groups. Some of the hydroxyl groups thus produced are converted into ester groups when they react with dicarboxylic acids in the polymerization system and carboxyl groups derived from a terminal blocking agent therein. When the concentration of hydroxyl groups and ester groups in the polyamide is higher than 0.70 mol % with respect to dicarboxylic acid units, the resulting polyamide has poor impact resistance. Probably, this is because the hydrogen bonding with amino groups between polyamide molecules and the interaction between amino groups and carboxyl groups at the terminals of the polyamide molecules are impaired, and thus the intermolecular forces are reduced. Also when the concentration of hydroxyl groups and ester groups in the polyamide is lower than 0.40 mol % with respect to 100 mol % of structural units derived from dicarboxylic acids, the resulting polyamide has poor impact resistance. Probably, this is because the interaction between the polyamide molecules is too strong to relax the molecular chains when subjected to impact.

The percentage of water absorption of the polyamide of the present invention is not particularly limited. The percentage of water absorption is preferably 6.5% or less, more preferably 5.0% or less, even more preferably 4.0% or less, and particularly preferably 3.0% or less because the water resistance of the polyamide is good enough and the dimensional changes due to absorption of moisture are smaller. The method for evaluating the percentage of water absorption is as described in Examples to be given below.

The melting point of the polyamide of the present invention is not particularly limited. The melting point is preferably 280 to 350° C., more preferably 290 to 345° C., and even more preferably 300 to 340° C. The method for evaluating the melting point is as described in Examples to be given below.

The impact resistance of the polyamide of the present invention is not particularly limited. The Charpy impact strength thereof is preferably 3.0 kJ/m$^2$ or more, more preferably 3.5 kJ/m$^2$ or more, and even more preferably 4.0 kJ/m$^2$ or more. The method for evaluating the Charpy impact strength is as described in Examples to be given below.

The weight average molecular weight of the polyamide of the present invention is not particularly limited. The weight average molecular weight thereof is preferably $20 \times 10^3$ to $80 \times 10^3$, more preferably $22 \times 10^3$ to $70 \times 10^3$, and even more preferably $25 \times 10^3$ to $60 \times 10^3$. When the weight average molecular weight is in the above range, not only the polyamide of the present invention has excellent melt-moldability but also the resulting melt-molded article has high strength and impact resistance. The method for evaluating weight average molecular weight is as described in Examples to be given below.

The polyamide of the present invention can be produced by any method known as a method for producing polyamides. An example of the preferred method for producing the polyamide used in the present invention is shown below.

The method for producing the polyamide of the present invention includes: a step (1) of feeding an aqueous nylon salt solution having a concentration of 50 to 90 mass % and a temperature of 100 to 180° C. into a reactor; and a step (2) of performing polymerization under the following conditions: the aqueous solution has a temperature of 230 to 260° C. in the reactor; a pressure in the reactor is 0.70 to 0.90 times a saturated vapor pressure of water at the temperature of 230 to 260° C.; and an average residence time of the aqueous solution in the reactor is 1 hour or less.

[Step (1)]

First, a mixture of a diamine, a dicarboxylic acid, water, and an optional component, for example, a terminal blocking agent or a catalyst such as sodium hypophosphite monohydrate or phosphorous acid to be hereinafter described, was heated with stirring in an atmosphere of an inert gas such as nitrogen and/or steam so as to prepare a homogeneous aqueous nylon salt solution. The heating temperature of the aqueous nylon salt solution is usually 100 to 180° C., and preferably 120 to 170° C. The molar ratio of amino groups contained in the diamine, the dicarboxylic acid, and the terminal blocking agent to carboxylic groups is 0.98 to 1.05, and preferably 0.99 to 1.03. When the molar ratio is out of the above range, the molecular weight of the polyamide cannot be not increased sufficiently. The amount of water can be adjusted appropriately to obtain a homogeneous aqueous nylon salt solution within the above-mentioned heating temperature range, and the nylon salt concentration of the aqueous solution is 50 to 90 mass %, and preferably 60 to 90 mass %. If a catalyst in an amount of 0.01 to 0.3 mass %, preferably of 0.02 to 0.2 mass %, with respect to the main components of the polyamide such as the diamine, the dicarboxylic acid, and the terminal blocking agent, is added, the resulting polyamide is free from gelation or coloration.

The aqueous nylon salt solution thus obtained is fed into a first reactor at an almost constant rate.

[Step (2)]

As the conditions suitable for the reaction in the first reactor, the solution temperature is 230 to 260° C., and preferably 235 to 258° C. The pressure in the reactor is 0.70 to 0.90 times, and preferably 0.75 to 0.85 times the saturated vapor pressure of water at that solution temperature. The reaction conditions are more preferably a solution temperature of 230 to 260° C. and a pressure of 0.70 to 0.90 times the saturated vapor pressure of water at that solution temperature, and even more preferably a solution temperature of 235 to 258° C. and a pressure of 0.75 to 0.85 times the saturated vapor pressure of water at that solution temperature. The average residence time of the aqueous solution in the first reactor is usually 1 hour or less, and preferably 0.8 hour or less. When the solution temperature, the pressure, and the average residence time are in these ranges, the total content of hydroxyl groups and ester groups with respect to dicarboxylic acid units can easily be controlled within the above range. The rate of feeding the aqueous nylon salt solution into the first reactor is not particularly limited as long as it is a constant rate at which the average residence time can be kept within the above range. For example, the feeding rate may be 0.5 L/hour to 10 L/hour. The first reactor is not particular limited as long as it is a continuous reactor. The first reactor is preferably a tube reactor or a continuous stirred tank reactor, for example.

[Step (3)]

The reaction solution obtained under the above-mentioned conditions is introduced from the first reactor into another reactor (second reactor), in which the amidation reaction is allowed to proceed to the approximate equilibrium state. As the reaction conditions in the second reactor, for example, the solution temperature is preferably 230 to 260° C., and more preferably 235 to 258° C. The pressure in the reactor is preferably 0.70 to 0.90 times, and more preferably 0.75 to 0.85 times the saturated vapor pressure of water at that solution temperature. The reaction conditions are even more preferably a solution temperature of 230 to 260° C. and a pressure of 0.70 to 0.90 times the saturated vapor pressure of water at that solution temperature, and particularly preferably a solution temperature of 235 to 258° C. and a pressure of 0.75 to 0.85 times the saturated vapor pressure of water at that solution temperature. When the concentration of amide groups of a polyamide precursor obtained in this process is divided by the concentration of amino groups before the reaction so as to obtain the degree of amidation, the degree of amidation of 85 to 95% leads to advantages such that an imbalance between the number of moles of carboxyl groups and that of amino groups is reduced or a decrease in the polymerization rate is reduced in the post-polymerization process, and thus the resulting polyamide has a narrower molecular weight distribution and has better physical properties and moldability. The second reactor is not particularly limited as long as it is a continuous reactor. The second reactor is preferably a tube reactor or a continuous stirred tank reactor, for example. The method for evaluating the degree of amidation is as described in Examples to be given below.

Subsequently, a polyamide having a desired weight average molecular weight (molecular weight) is obtained by either of the following two methods. One method is (i) solid-phase polymerization, in which the polyamide precursor obtained in the above-described steps is cooled, solidified, dried, and optionally pulverized into polyamide precursor particles, 50 mass % of which pass through a sieve with a mesh size of 0.1 to 3.0 mm, and the polyamide precursor particles are maintained at a temperature lower than the melting point of the polyamide, specifically at a temperature of 200 to 270° C. for 2 to 12 hours under reduced pressure or under an inert gas flow. The mesh size of the sieve is more preferably 0.2 to 0.9 mm. The other method is (ii) melt polymerization, in which the temperature of the reaction system is increased to the melting point of the polyamide or higher, while the steam as the gas phase portion of the reaction system is released outside so as to reduce the pressure of the pre-polymerized reaction system to about 1 atmospheric pressure.

Examples of the catalyst that can be used to produce the polyamide include salts of phosphoric acid, phosphorous acid, and hypophosphorous acid with metals such as potassium, sodium, magnesium, vanadium, calcium, zinc, cobalt, manganese, tin, tungsten, germanium, titanium, and antimony; ammonium salts of phosphoric acid, phosphorous acid, and hypophosphorous acid; and ethyl esters, isopropyl esters, butyl esters, hexyl esters, isodecyl esters, octadecyl esters, decyl esters, and stearyl esters of phosphoric acid, phosphorous acid, and hypophosphorous acid. In particular, sodium hypophosphite monohydrate or phosphorous acid is preferred.

The polyamide of the present invention may contain other optional components such as a thermoplastic resin other than the polyamide of the present invention, a compatibilizer, a filler, a silane coupling agent, a nucleating agent, a copper-based thermal stabilizer, an antioxidant such as a hindered phenol antioxidant, a hindered amine antioxidant, a phosphorus-based antioxidant, or a thio-based antioxidant, a dye, a pigment, an ultraviolet absorber, a light stabilizer, an antistatic agent, a lubricant, a plasticizer, a lubricant, a flame retardant, a flame retardant aid, and a processing aid, as needed.

The polyamide of the present invention or the polyamide composition containing the above-mentioned components can be molded into any desired molded article by any molding method commonly applicable to thermoplastic resin compositions, such as injection molding, extrusion molding, press molding, blow molding, calender molding, or cast molding, according to the type, purpose, shape, etc. of the desired molded article. Two or more of the above-mentioned molding methods may be used in combination. Furthermore, the polyamide of the present invention or the polyamide composition containing the above-mentioned components may be bonded, welded, or joined with other various materials such as thermoplastic resins, thermosetting resins, papers, metals, woods, and ceramics to obtain composite molded articles.

Since the polyamide of the present invention or the polyamide composition containing the above-mentioned components has many excellent properties, they can be effectively used in producing various molded articles of any shape and for any application, such as electrical and electronic components, automobile components, industrial components, fibers, films, sheets, household goods, and others, through the molding process as described above.

Examples of the electrical and electronic components include: surface-mountable components such as FPC connectors, B-to-B connectors, USB connectors, memory card connectors, USB connectors, AV connectors, coaxial connectors, FFC connectors, switches, relays, bobbins, CPU sockets, LED reflectors, and various camera module components; power semiconductor cases such as IGBT module cases and SiC power semiconductor module cases; cable wire coatings; optical fiber components; noise reduction gears for AV/OA equipment; flasher components; mobile phone components; heat-resistant gears for copiers; end caps; commutators; industrial plugs; command switches; noise filters; magnet switches; solar cell substrates; liquid crystal boards; LED mounting boards; flexible printed wiring boards; and flexible flat cables.

Examples of the automobile components include: cooling components such as thermostat housings, radiator tanks, radiator hoses, water outlets, water inlets, rear joints, and water pump housings; breather components such as intercooler tanks, resonators, throttle bodies, intake manifolds, and tail pipes; fuel system components such as fuel delivery pipes, gasoline tanks, quick connectors, canisters, pump modules, fuel ducts, oil strainers, lock nuts, and sealants; structural components such as mount brackets, torque rods, and cylinder head covers; drive-line components such as bearing retainers, gear tensioners, head lamp actuator gears, slide door rollers, and clutch-surrounding components; brake components such as air brake tubes; in-vehicle electrical components such as wire harness connectors in engine rooms, motor components, sensors, ABS bobbins, combination switches, and in-vehicle switches; interior and exterior components such as slide door dampers, door mirror stays, door mirror brackets, inner mirror stays, roof rails, engine mount brackets, inlet pipes of air cleaners, door checkers, plastic chains, emblems, clips, breaker covers, cup holders, air bags, fenders, spoilers, radiator supports, radiator grills, louvers, air scoops, hood bulges, back doors, and fuel sender modules.

Examples of the industrial components include gas pipes, pipes for oil digging, hoses, ant-proof cables (communication cables, path cables, etc.), coatings of powder-coated articles (inner coatings of water pipes), offshore oilfield pipes, pressure hoses, hydraulic tubes, paint tubes, fuel pumps, separators, supercharge ducts, butterfly valves, conveyor roller bearings, railroad tie spring holders, outboard engine covers, power generator engine covers, irrigation valves, large-size switches, and monofilaments (extruded yarns) for fish nets.

Examples of the fibers include airbag base fabrics, heat-resistant filters, reinforcing fibers, bristles for brushes, fish lines, tire cords, artificial turfs, carpets, and fibers for seats. Examples of the films and sheets include heat-resistant adhesive tapes such as heat-resistant masking tapes and industrial tapes; materials for magnetic tapes such as cassette tapes, magnetic tapes for digital data storage, and video tapes; food packaging materials for pouches for retort foods, individual packaging of sweets, and packaging of processed meat products; and electronic component packaging materials for packaging for semiconductor packages.

In addition, the polyamide of the present invention or the polyamide composition containing the above-mentioned components can also be used suitably for plastic magnets, shoe soles, tennis rackets, ski boards, bond magnets, eyeglass frames, banding bands, tag pins, crescent sash locks, electric power tool motor fans, insulating blocks for motor stators, engine covers for lawn trimmers, fuel tanks for lawn trimmers, ultra-small-size slide switches, DIP switches, switch housings, lamp sockets, connector shells, IC sockets, bobbin covers, relay boxes, capacitor cases, small-size motor cases, gears, cams, dancing pulleys, spacers, insulators, fasteners, casters, wire clips, bicycle wheels, terminal blocks, insulating components of starters, fuse boxes, air cleaner cases, air conditioner fans, terminal housings, wheel covers, bearing retainers, water pipe impellers, clutch release bearing hubs, heat-resistant containers, microwave oven components, rice cooker components, and printer ribbon guides.

The present invention includes other embodiments achieved by combining the above-described configurations in various ways within the technical scope of the present invention as long as the effects of the present invention can be obtained.

EXAMPLES

Hereinafter, the present invention will be described more specifically with reference to examples, but the present invention is not limited in any way by the following examples. In the following examples, the various physical properties were evaluated by the methods as described below.

[Degree of Amidation of Polyamide Precursor]

1 g of each polyamide precursor was dissolved in 35 cc of phenol at 110° C., and the resulting solution was cooled to 20 to 30° C. Then, 3 ml of methanol and a few drops of thymol blue were added to the solution, and the resulting solution was titrated with 0.1 N sodium hydroxide to determine the concentration of amino groups in the polyamide precursor. In the case of Example, 1, for example, the amino group concentration before the reaction was calculated as follows: 45.969 moles×2÷ (7276.4 g+7484.1 g+224.55 g+14.99 g)=6.13×10$^{-3}$ moles. In this case, the degree of amidation of the polyamide precursor was calculated as follows: 1−(amino group concentration of polyamide precursor)÷6.13×10$^{-3}$.

<Monomer Composition of Polyamide>

20 to 30 mg of each polyamide was dissolved in 1 ml of deuterated 1,1,1,3,3,3-hexafluoro-2-propanol. The resulting solution was subjected to $^1$H-NMR spectroscopy at room temperature using a nuclear magnetic resonance apparatus JNM-ECX400 manufactured by JEOL, Ltd., and 256 scans were accumulated. The monomer composition of each polyamide was calculated according to Tables 1 to 3. Table 1 shows the assignment of the $^1$H-NMR spectrum of the polyamide. Table 2 shows the methods of calculating the molar ratios of the structural units of each polyamide. Table 3 shows the method of calculating the monomer composition of each polyamide.

TABLE 1

| Symbol | ppm | Assignment |
|---|---|---|
| A | 2.7 | Protons of adipic acid unit in polyamide |
| B | 3.3 to 3.6 | Protons of methylene group adjacent to nitrogen atom of diamine unit in polyamide |
| C | 4.5 | Protons of methylene group adjacent to oxygen atom of hydroxyl group or ester group |
| D | 7.5 | Protons in meta position of benzoic acid unit at terminal of polyamide |
| E | 7.6 | Protons in 5-position of isophthalic acid unit in polyamide |
| F | 7.8 | Protons of terephthalic acid unit in polyamide |
| G | 3.73 | Protons of methylene group adjacent to hydroxyl group |

TABLE 2

| Symbol | Component | Molar ratio |
|---|---|---|
| H | Diamine units having 4 to 12 carbon atoms | B ÷ 4 |
| I | Aromatic dicarboxylic acid units | E + F ÷ 4 |
| J | Adipic acid units | A ÷ 4 |
| K | Units derived from terminal blocking agent | D ÷ 2 |
| L | Hydroxyl groups | G ÷ 2 |
| M | Ester groups | (C − G) ÷ 2 |

(As to the meaning of the symbols A to G in this table, see Table 1)

TABLE 3

| Monomer composition of polyamide | Molar ratio |
|---|---|
| Aromatic dicarboxylic acid units | I ÷ (H + I + J + K) |
| Diamine units having 4 to 12 carbon atoms | H ÷ (H + I + J + K) |
| Units derived from terminal blocking agent | K ÷ (H + I + J + K) |

(As to the meaning of the symbols H to K in this table, see Table 2)

<Hydroxyl Groups and Ester Groups in Polyamide>

20 to 30 mg of each polyamide was dissolved in 1 ml of deuterated 1,1,1,3,3,3-hexafluoro-2-propanol. The resulting solution was subjected to $^1$H-NMR spectroscopy at room temperature using a nuclear magnetic resonance apparatus JNM-ECX400 manufactured by JEOL, Ltd., and 256 scans were accumulated. The molar ratios of hydroxyl groups and ester groups in each polyamide were calculated according to Table 1, Table 2, and Table 4. Table 4 shows the methods of calculating the molar ratios of hydroxyl groups and ester groups in each polyamide.

TABLE 4

| Content with respect to dicarboxylic acid units | Molar ratio |
|---|---|
| Hydroxyl groups | L ÷ (I + J) |
| Ester groups | M ÷ (I + J) |

(As to the meaning of the symbols I, J, L and M in this table, see Table 2)

<Melting Point of Polyamide>

The melting point of each sample was determined as follows. In a differential scanning calorimeter (DSC822) manufactured by Mettler Toledo, 10 mg of each polyamide was heated in a nitrogen atmosphere at a rate of 10° C./min from 30° C. to 350° C. and held at 350° C. for 3 minutes. Then, the polyamide was cooled at a rate of 10° C./min to 50° C. and held at 50° C. for 1 minute. Then, the polyamide was heated again at a rate of 10° C./min from 50° C. to 360° C., and the peak temperature of the melting peak appearing in this re-heating was determined as the melting point of the polyamide. In the case of the polyamide having two or more melting peaks, the highest one of the peak temperatures of the melting peaks was determined as its melting point.

<Percentage of Water Absorption of Polyamide>

Each polyamide was formed into a JIS type flat plate (with dimensions of 80 mm×80 mm×3 mm) and then immersed in water at 80° C. A change in the weight of the formed plate between before and after the immersion was determined as the percentage of water absorption of the polyamide.

<Weight Average Molecular Weight of Polyamide>

A solution obtained by dissolving 10 mM of sodium trifluoroacetate in 1,1,1,3,3,3-hexafluoroisopropanol (HFIP) was used for preparation of a sample solution and as an eluent. 5 mg of the polyamide was dissolved in 5 ml of the solution prepared as described above and the resulting solution was filtered through a membrane filter with a pore size of 2 μm to prepare a sample solution. 90 μL of the sample solution was injected into the eluent at a flow rate of 1 mL/min, and the resulting solution was passed through a column ("HFIP-806M" manufactured by Showa Denko K.K.) maintained at 40° C., and then detection was performed with a RI detector ("RID-10A" manufactured by Showa Denko K.K.). Thus, an elution curve was obtained. The elution curve was compared with a calibration curve prepared using a PMMA standard sample ("STANDARD M-75" manufactured by Showa Denko K.K. (number average molecular weight range: 1,800 to 950,000) so as to calculate the weight average molecular weight of the polyamide.

<Impact Resistance of Polyamide>

Each polyamide was injection-molded into an ISO multipurpose sample piece type A. The notched Charpy impact strength of the test sample was determined at 23° C. according to ISO 179/1 eA and used as a measure of the impact resistance of the polyamide.

Example 1

7276.4 g (45.969 moles) of a mixture of 1,9-nonanediamine and 2-methyl-1,8-octanediamine with a molar ratio of 85:15, 7484.1 g (45.049 moles) of terephthalic acid, 224.55 g (1.839 moles) of benzoic acid, 14.99 g of sodium hypophosphite monohydrate, and 5000.0 g of water were stirred at 150° C. to prepare an aqueous nylon salt solution containing 25 mass % of water. While feeding this aqueous nylon salt solution having a temperature of 150° C. into a reactor 1 configured to maintain the amount of liquid therein constant in an overflow manner (i.e., the amount of water at 23° C. in the reactor is maintained at 0.5 L when it is fed therein until it overflows) at a rate of 1 L/hour (the residence time of the water in the reactor is defined as 0.5 L÷1 L/hour=0.5 hour), the temperature of the aqueous nylon salt solution was adjusted to 250° C. (at which the saturated vapor pressure of water is 4.0 MPa) and the pressure in the reactor was adjusted to 3.3 MPa (which is 0.83 times the saturated vapor pressure of water). To maintain the pressure at 3.3 MPa, the steam as the gas phase portion of the reaction system is released and the released steam was condensed in a condenser to obtain a water-based condensate liquid. The condensate liquid was obtained at a rate of 0.209 L/hour when the amount thereof was measured. The solution overflowing the reactor 1 was introduced into a reactor 2 for which the temperature of the solution, the pressure in the reactor 2, and the residence time of the solution were adjusted to 250° C., 3.3 MPa, and 2.53 hours (the amount of water at 23° C. contained therein 2L÷ (1−0.209) L/hour=2.53 hours), respectively. The solution contained in the reactor 2 was indirectly heated with the steam at 120° C. from the bottom of the reactor 2 to feed the solution continuously into a can with an air vent at its upper portion. Dehydration, cooling, and granulation were performed in this can. Thus, a particulate polyamide precursor having a particle size such that 50 mass % thereof passed through a sieve with a mesh size of 0.5 mm, a water content of 3 mass %, and a degree of amidation of 88% was obtained. This polyamide precursor was subjected to solid phase polymerization in a batch-type reactor at a jacket temperature of 230° C. and 1 torr for 10 hours. Thus, a polyamide was obtained. Table 5 shows the composition and physical properties of the polyamide.

Example 2

A polyamide was obtained by the method described in Example 1, except that 7594.5 g (44.072 moles) of 1,10-decanediamine, 7175.3 g (43.191 moles) of terephthalic acid, and 215.28 g (1.763 moles) of benzoic acid were used. The degree of amidation of the polyamide precursor was 87%. Table 5 shows the composition and physical properties of the polyamide thus obtained.

Example 3

A polyamide was obtained by the method described in Example 1, except that 6155.7 g (55.880 moles) of 1,6-hexanediamine, 5054.8 g (30.427 moles) of terephthalic acid, 3638.1 g (24.894 moles) of adipic acid, and 136.48 g (1.118 moles) of benzoic acid were used. The degree of amidation of the polyamide precursor was 87%. Table 5 shows the composition and physical properties of the polyamide thus obtained.

Example 4

A polyamide was obtained by the method described in Example 1, except that 5957.9 g (54.084 moles) of 1,6-hexanediamine, 6226.6 g (37.480 moles) of terephthalic acid, 2668.5 g (16.063 moles) of isophthalic acid, and 132.09 g (1.082 moles) of benzoic acid were used. The degree of amidation of the polyamide precursor was 87%. Table 5 shows the composition and physical properties of the polyamide thus obtained.

Example 5

A polyamide was obtained by the method described in Example 1, except that 3276.8 g (29.746 moles) of 1,6-hexanediamine, 2681.0 g (24.338 moles) of 2-methyl-1,5-pentanediamine, 8895.1 g (53.543 moles) of terephthalic acid, and 132.09 g (1.082 moles) of benzoic acid were used. The degree of amidation of the polyamide precursor was 87%. Table 5 shows the composition and physical properties of the polyamide thus obtained.

Comparative Example 1

A polyamide was polymerized by the method described in Example 1, except that the temperature of the solution in the reactor 1 was 270° C. (at which the saturated vapor pressure of water is 5.5 MPa) and the pressure in the reactor 1 was 4.5 MPa (which is 0.82 times the saturated vapor pressure of water). Table 5 shows the composition and physical properties of the polyamide thus obtained.

Comparative Example 2

A polyamide was polymerized by the method described in Example 1, except that the amount of water at 23° C. to be maintained in the reactor 1 when it was fed therein until it overflowed was set to 0.3 L. Table 5 shows the composition and physical properties of the polyamide thus obtained.

Comparative Example 3

7276.4 g (45.969 moles) of a mixture of 1,9-nonanediamine and 2-methyl-1,8-octanediamine with a molar ratio of 85:15, 7484.1 g (45.049 moles) of terephthalic acid, 224.55 g (1.839 moles) of benzoic acid, 14.99 g of sodium hypophosphite monohydrate, and 15000.0 g of Dowtherm A (a mixture of diphenyl ether and biphenyl with a mass ratio of 7:3) were put into an autoclave with a net volume of 50 liters, and the resulting mixture was purged with nitrogen. The temperature inside the autoclave was raised to 230° C. over 2 hours, and the reaction was allowed to proceed for 3 hours. The reaction was allowed to proceed with continuous stirring. A portion of the steam was removed as needed to maintain the pressure in the reactor at 0.5 MPa or less. The reaction mixture in the autoclave was cooled to about room temperature and then removed therefrom. Dowtherm A was removed using a 4 G glass filter, followed by drying at 200° C. for 12 hours under reduced pressure. Thus, a polyamide was obtained. Table 5 shows the composition and physical properties of the polyamide.

Comparative Example 4

The aqueous nylon salt solution of Example 2 was allowed to react under the conditions of Comparative Example 1. Thus, a polyamide was obtained. Table 5 shows the composition and physical properties of the polyamide.

Comparative Example 5

The aqueous nylon salt solution of Example 2 was allowed to react under the conditions of Comparative Example 3. Thus, a polyamide was obtained. Table 5 shows the composition and physical properties of the polyamide.

Comparative Example 6

The aqueous nylon salt solution of Example 3 was allowed to react under the conditions of Comparative Example 1. Thus, a polyamide was obtained. Table 5 shows the composition and physical properties of the polyamide.

Comparative Example 7

The aqueous nylon salt solution of Example 3 was allowed to react under the conditions of Comparative Example 3. Thus, a polyamide was obtained. Table 5 shows the composition and physical properties of the polyamide.

Comparative Example 8

The aqueous nylon salt solution of Example 4 was allowed to react under the conditions of Comparative Example 1. Thus, a polyamide was obtained. Table 5 shows the composition and physical properties of the polyamide.

Comparative Example 9

The aqueous nylon salt solution of Example 4 was allowed to react under the conditions of Comparative Example 3. Thus, a polyamide was obtained. Table 5 shows the composition and physical properties of the polyamide.

Comparative Example 10

The aqueous nylon salt solution of Example 5 was allowed to react under the conditions of Comparative Example 1. Thus, a polyamide was obtained. Table 5 shows the composition and physical properties of the polyamide.

Comparative Example 11

The aqueous nylon salt solution of Example 5 was allowed to react under the conditions of Comparative Example 3. Thus, a polyamide was obtained. Table 5 shows the composition and physical properties of the polyamide.

Comparative Example 12

A polyamide was obtained by the method described in Example 1, except that 5920.6 g (53.746 moles) of 1,6-hexanediamine, 8750.21 g (52.671 moles) of adipic acid, and 314.18 g (2.150 moles) of benzoic acid were used. The degree of amidation of the polyamide precursor was 92%. Table 5 shows the composition and physical properties of the polyamide thus obtained.

TABLE 5

| | | | Ex. 1 | Ex. 2 | Ex. 3 | Ex. 4 | Ex. 5 | Com. Ex. 1 | Com. Ex. 2 | Com. Ex. 3 | Com. Ex. 4 |
|---|---|---|---|---|---|---|---|---|---|---|---|
| Production of polyamide | Monomers (molar ratio) | TA | 49 | 49 | 27.225 | 34.65 | 49.5 | 49 | 49 | 49 | 49 |
| | | IA | | | | 14.85 | | | | | |
| | | AA | | | 22.275 | | | | | | |
| | | HD | | | 50 | 50 | 27.5 | | | | |
| | | MPD | | | | | 22.5 | | | | |
| | | ND | 50 | | | | | 50 | 50 | 50 | |
| | | DD | | 50 | | | | | | | 50 |
| | | BA | 2 | 2 | 1 | 1 | 1 | 2 | 2 | 2 | 2 |
| | Monomers (mol %) | TA | 48.515 | 48.515 | 27.090 | 34.478 | 49.254 | 48.515 | 48.515 | 48.515 | 48.515 |
| | | IA | | | | 14.776 | | | | | |
| | | AA | | | 22.164 | | | | | | |
| | | HD | | | 49.751 | 49.751 | 27.363 | | | | |
| | | MPD | | | | | 22.388 | | | | |
| | | ND | 49.505 | | | | | 49.505 | 49.505 | 49.505 | |
| | | DD | | 49.505 | | | | | | | 49.505 |
| | | BA | 1.980 | 1.980 | 0.995 | 0.995 | 0.995 | 1.980 | 1.980 | 1.980 | 1.980 |
| | Conditions for reactor 1 | Temperature (° C.) | 250 | 250 | 250 | 250 | 250 | 270 | 250 | — | 270 |
| | | Saturated vapor pressure of water at above temperature P0 (MPa) | 4.0 | 40 | 4.0 | 4.0 | 4.0 | 5.5 | 4.0 | — | 5.5 |
| | | Pressure (MPa) | 3.3 | 3.3 | 3.3 | 3.3 | 3.3 | 4.5 | 3.3 | — | 4.5 |
| | | P1/P0 | 0.83 | 0.83 | 0.83 | 0.83 | 0.83 | 0.82 | 0.83 | — | 0.82 |
| | | Average residence time | 0.5 | 0.5 | 0.5 | 0.5 | 0.5 | 0.5 | 3 | — | 0.5 |
| Physical properties of prepolymer | Degree of amidation | | 87% | 87% | 87% | 87% | 87% | 88% | 87% | N.A. | |
| Composition of polyamide | Monomer composition (mol %) | Aromatic dicarboxylic acid units | 48.9 | 49.0 | 27.6 | 49.9 | 49.7 | 49.0 | 49.1 | 49.0 | 49.1 |
| | | Diamine units having 4 to 12 carbon atoms | 49.3 | 49.2 | 49.2 | 49.2 | 49.4 | 49.1 | 49.2 | 49.4 | 49.1 |
| | | Units derived from terminal blocking agent | 1.8 | 1.8 | 0.9 | 0.9 | 0.9 | 1.9 | 1.7 | 1.8 | 1.8 |
| | Mol % with respect to dicarboxylic acid units | Hydroxyl groups | 0.20 | 0.19 | 0.15 | 0.22 | 0.22 | 0.50 | 0.42 | 0.01 | 0.50 |
| | | Ester groups | 0.40 | 0.38 | 0.38 | 0.35 | 0.41 | 0.70 | 0.77 | 0.10 | 0.70 |
| | | Hydroxyl groups + Ester groups | 0.60 | 0.57 | 0.53 | 0.57 | 0.63 | 1.20 | 1.19 | 0.11 | 1.20 |
| Physical properties of polyamide | Melting point | ° C. | 306 | 317 | 301 | 324 | 303 | 306 | 305 | 306 | 316 |
| | Percentage of water absorption | % | 2.0 | 1.9 | 6.1 | 3.9 | 3.8 | 2.0 | 2.0 | 1.9 | 1.8 |
| | Weight average molecular weight | ×10$^{-3}$ | 31 | 30 | 45 | 31 | 29 | 35 | 32 | 33 | 31 |
| | Impact resistance | kJ/m$^2$ | 5.0 | 5.8 | 4.1 | 3.7 | 3.5 | 1.2 | 1.1 | 1.1 | 1.4 |

| | | | Com. Ex. 5 | Com. Ex. 6 | Com. Ex. 7 | Com. Ex. 8 | Com. Ex. 9 | Com. Ex. 10 | Com. Ex. 11 | Com. Ex. 12 |
|---|---|---|---|---|---|---|---|---|---|---|
| Production of polyamide | Monomers (molar ratio) | TA | 49 | 27.225 | 27.225 | 34.65 | 34.65 | 49.5 | 49.5 | |
| | | IA | | | | 14.85 | 14.85 | | | |
| | | AA | | 22.275 | 22.275 | | | | | 49 |
| | | HD | | 50 | 50 | 50 | 50 | 27.5 | 27.5 | 50 |
| | | MPD | | | | | | 22.5 | 22.5 | |
| | | ND | | | | | | | | |

TABLE 5-continued

| | | | | | | | | | | |
|---|---|---|---|---|---|---|---|---|---|---|
| | | DD | 50 | | | | | | | |
| | | BA | 2 | 1 | 1 | 1 | 1 | 1 | 1 | 2 |
| | Monomers (mol %) | TA | 48.515 | 27.090 | 27.090 | 34.478 | 34.478 | 49.254 | 49.254 | 0.000 |
| | | IA | | | | 14.776 | 14.776 | | | |
| | | AA | | 22.164 | 22.164 | | | | | 48.515 |
| | | HD | | 49.751 | 49.751 | 49.751 | 49.751 | 27.363 | 27.363 | 49.505 |
| | | MPD | | | | | | 22.388 | 22.388 | |
| | | ND | | | | | | | | |
| | | DD | 49.505 | | | | | | | |
| | | BA | 1.980 | 0.995 | 0.995 | 0.995 | 0.995 | 0.995 | 0.995 | 1.980 |
| | Conditions for reactor 1 | Temperature (° C.) | — | 270 | — | 270 | — | 270 | — | 250 |
| | | Saturated vapor pressure of water at above temperature P0 (MPa) | — | 5.5 | — | 5.5 | — | 5.5 | — | 40 |
| | | Pressure (MPa) | — | 4.5 | — | 4.5 | — | 4.5 | — | 3.3 |
| | | P1/P0 | — | 0.82 | — | 0.82 | — | 0.82 | — | 0.83 |
| | | Average residence time | — | 0.5 | — | 0.5 | — | 0.5 | — | 0.5 |
| Physical properties of prepolymer | Degree of amidation | | N.A | N.A. | N.A. | N.A. | | | 92% | |
| Composition of polyamide | Monomer composition (mol %) | Aromatic dicarboxylic acid units | 48.9 | 27.7 | 27.5 | 50.0 | 49.9 | 49.8 | 49.6 | 0.0 |
| | | Diamine units having 4 to 12 carton atoms | 49.3 | 49.0 | 49.3 | 49.1 | 49.2 | 49.3 | 49.5 | 49.5 |
| | | Units derived from terminal blocking agent | 1.8 | 1.0 | 0.9 | 0.9 | 0.9 | 0.9 | 0.9 | 1.9 |
| | Mol % with respect to dicarboxylic acid units | Hydroxyl groups | 0.01 | 0.50 | 0.01 | 0.50 | 0.01 | 0.50 | 0.01 | 0.13 |
| | | Ester groups | 0.10 | 0.70 | 0.10 | 0.70 | 0.10 | 0.70 | 0.10 | 0.32 |
| | | Hydroxyl groups + Ester groups | 0.11 | 1.20 | 0.11 | 1.20 | 0.11 | 1.20 | 0.11 | 0.45 |
| Physical properties of polyamide | Melting point | ° C. | 317 | 300 | 302 | 323 | 324 | 300 | 302 | 261 |
| | Percentage of water absorption | % | 1.9 | 6.2 | 6.1 | 3.9 | 3.8 | 3.9 | 3.9 | 8.0 |
| | Weight average molecular weight | $\times 10^{-3}$ | 33 | 44 | 42 | 33 | 34 | 27 | 26 | 31 |
| | Impact resistance | $kJ/m^2$ | 1.4 | 1.0 | 0.9 | 0.8 | 0.8 | 0.7 | 0.8 | 6.1 |

TA: terephthalic acid,
IA: isophthalic acid,
AA: adipic acid,
HD: 1,6-hexanediamine,
MPD: 2-methyl-1,5-pentanediamine,
ND: mixture of 1,9-nonanediamine and 2-methyl-1,8-octanediamine with a molar ratio of 85:15,
DD: 1,10-decanediamine,
BA: benzoic acid In Comparative Examples 1, 4, 6, 8, and 10, in which the temperature in the reactor 1 was as high as 270° C., the total content of hydroxyl groups and ester groups in the polyamide was higher than the range defined in the present invention, and its impact resistance was inferior to that in Examples. In Comparative Example 2, in which the average residence time in the reactor 1 was as long as 3 hours, the total content of hydroxyl groups and ester groups in the polyamide was higher than the range defined in the present invention, and its impact resistance was inferior to that in Examples. In Comparative Examples 3, 5, 7, 9, and 11, in which batch-type polymerization was performed, the total content of hydroxyl groups and ester groups in the polyamide was outside the range defined in the present invention, and its impact resistance was inferior to that in Examples. In Comparative Example 12 containing no aromatic dicarboxylic acid unit, the melting point was lower than that in Examples, and the percentage of water absorption was higher than that in Examples.

INDUSTRIAL APPLICABILITY

The polyamide resin of the present invention has excellent heat resistance, water resistance, and impact resistance, and thus can be effectively used to produce various molded articles of any shape and for any application, such as electrical and electronic components, automobile components, industrial components, fibers, films, sheets, household goods, and others. The method for producing the polyamide is useful for producing a polyamide having excellent heat resistance, water resistance, and impact resistance.

The invention claimed is:
1. A polyamide comprising:
structural units derived from an aromatic dicarboxylic acid; and
structural units derived from an aliphatic diamine;
wherein:
the polyamide comprises 0.40 to 0.70 mol % in total of hydroxyl groups and ester groups with respect to 100 mol % of structural units derived from dicarboxylic acids; and
a main chain of the polyamide comprises structural units derived from at least one of a diol and an amino alcohol having two or fewer hydroxyl groups.
2. The polyamide according to claim 1, comprising 25 to 52 mol % of the structural units derived from the aromatic dicarboxylic acid and 30 to 53 mol % of the structural units derived from the aliphatic diamine, where a total content of the structural units derived from the aromatic dicarboxylic acid and the structural units derived from the aliphatic diamine is 100 mol % or less.

3. The polyamide according to claim 1, wherein the aromatic dicarboxylic acid is terephthalic acid.

4. The polyamide according to claim 1, wherein the aliphatic diamine is an aliphatic diamine having 4 to 12 carbon atoms.

5. The polyamide according to claim 4, wherein the aliphatic diamine having 4 to 12 carbon atoms is at least one selected from the group consisting of 1,6-hexanediamine, 2-methyl-1,5-pentanediamine, 1,9-nonanediamine, 2-methyl-1,8-octanediamine, and 1,10-decanediamine.

6. The polyamide according to claim 1, further comprising 0.5 to 4 mol % of structural units derived from a terminal blocking agent.

7. A method for producing the polyamide according to claim 1, the method comprising:
 feeding an aqueous nylon salt solution having a concentration of 50 to 90 mass % and a temperature of 100 to 180° C. into a reactor; and
 performing polymerization under the following conditions:
  the aqueous solution has a temperature of 230 to 260° C. in the reactor;
  a pressure in the reactor is 0.70 to 0.90 times a saturated vapor pressure of water at the temperature of 230 to 260° C.; and
  an average residence time of the aqueous solution in the reactor is 1 hour or less;
 wherein the polymerization is performed in the presence of water so that amino groups derived from the diamine are hydrolyzed into hydroxyl groups.

8. The polyamide according to claim 2, wherein the aromatic dicarboxylic acid is terephthalic acid.

9. The polyamide according to claim 2, wherein the aliphatic diamine is an aliphatic diamine having 4 to 12 carbon atoms.

10. The polyamide according to claim 3, wherein the aliphatic diamine is an aliphatic diamine having 4 to 12 carbon atoms.

11. The polyamide according to claim 9, wherein the aliphatic diamine having 4 to 12 carbon atoms is at least one selected from the group consisting of 1,6-hexanediamine, 2-methyl-1,5-pentanediamine, 1,9-nonanediamine, 2-methyl-1,8-octanediamine, and 1,10-decanediamine.

12. The polyamide according to claim 10, wherein the aliphatic diamine having 4 to 12 carbon atoms is at least one selected from the group consisting of 1,6-hexanediamine, 2-methyl-1,5-pentanediamine, 1,9-nonanediamine, 2-methyl-1,8-octanediamine, and 1,10-decanediamine.

13. The polyamide according to claim 2, further comprising 0.5 to 4 mol % of structural units derived from a terminal blocking agent.

14. The polyamide according to claim 3, further comprising 0.5 to 4 mol % of structural units derived from a terminal blocking agent.

15. The polyamide according to claim 4, further comprising 0.5 to 4 mol % of structural units derived from a terminal blocking agent.

16. The polyamide according to claim 1, wherein the polyamide comprises 0.10 to 0.30 mol % of hydroxyl groups with respect to 100 mol % of the structural units derived from dicarboxylic acids.

17. The polyamide according to claim 1, wherein at least one of the structural units derived from the diol or the amino alcohol having two or fewer hydroxyl groups is introduced into the polyamide by adding the diol or the amino alcohol during polymerization to form the polyamide.

18. The polyamide according to claim 1, wherein at least one of the structural units derived from the diol or the amino alcohol having two or fewer hydroxyl groups is introduced into the polyamide by polymerization in the presence of water so as to allow amino groups of the diamine to be hydrolyzed into hydroxyl groups.

19. The polyamide according to claim 1, wherein:
 the aromatic dicarboxylic acid is terephthalic acid; and
 a content in mol % of ester groups with respect to 100 mol % of structural units derived from dicarboxylic acids in the polyamide is 1.5 to 5.0 times a content in mol % of hydroxyl groups with respect to 100 mol % of structural units derived from dicarboxylic acids.

20. The polyamide according to claim 1, wherein:
 a melting point of the polyamide is 300 to 340° C.;
 the polyamide has a Charpy impact strength of 4.0 kJ/m$^2$ or more; and
 a weight average molecular weight of the polyamide is $25 \times 10^3$ to $60 \times 10^3$.

* * * * *